April 10, 1928.
T. A. CONLON
1,665,656
AZIMUTH SCALE WITH MICROMETER MECHANISM
Filed Oct. 5, 1925　　2 Sheets-Sheet 2
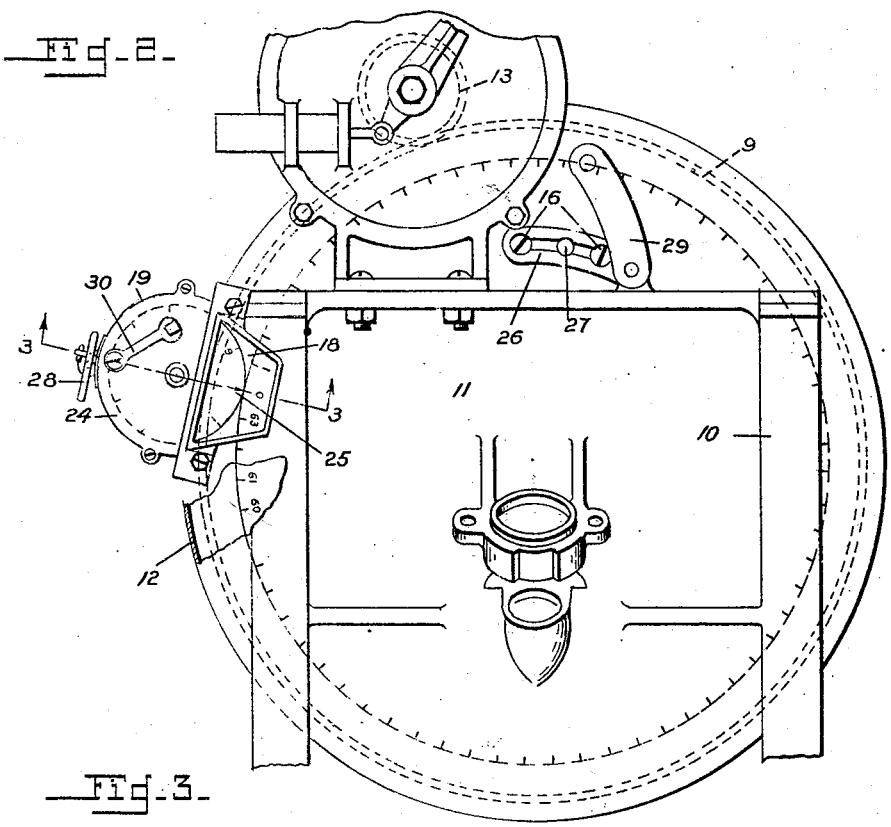
Fig. 2.
Fig. 3.
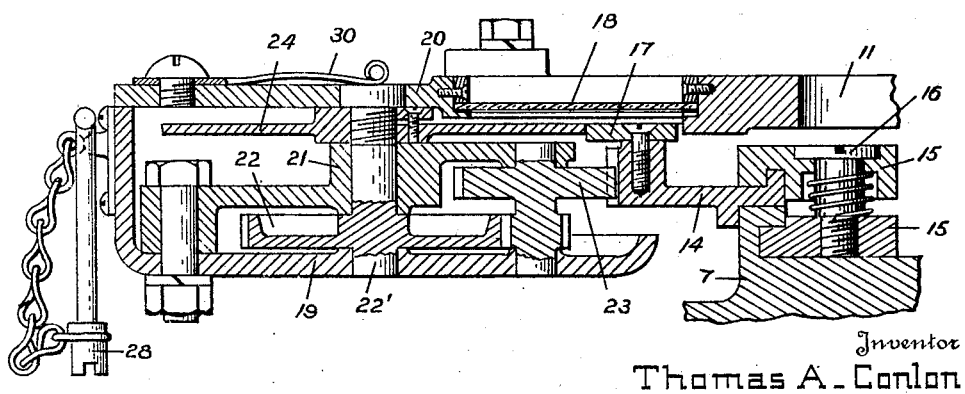
Inventor
Thomas A. Conlon
By W. N. Roach
Attorney Patented Apr. 10, 1928.

1,665,656

UNITED STATES PATENT OFFICE.

THOMAS A. CONLON, OF SILVER SPRING, MARYLAND.

AZIMUTH SCALE WITH MICROMETER MECHANISM.

Application filed October 5, 1925. Serial No. 60,616.

(GRANTED UNDER THE PROVISIONS OF THE ACT OF MARCH 3, 1883, 22 STAT. L., 625.)

The invention described herein may be used by the Government, or any of its officers or employees in prosecution of work for the Government, or by any other person in the United States, without payment to me of any royalty thereon, in accordance with the act of March 3, 1883.

The subject of this invention is an azimuth scale with micrometer mechanism.

When employing artillery especially against rapidly moving targets, it is essential for correct training of the piece that the readings of the scale be accurate and that no unnecessary time be lost in properly setting the scales. In the present practice of using the artillery mil as the unit of measurement the azimuth scale of the ordinary mount may be conveniently graduated from 0 to 64,000 in increments of 100 mils.

The purpose of the present invention is to provide a micrometer mechanism which will permit the operator to readily and accurately set the gun to single mils.

To these and other ends, the invention consists in the construction, arrangement, and combination of elements described hereinafter and pointed out in the claims forming a part of this specification.

A practical embodiment of my invention is illustrated in the accompanying drawings, wherein:

Fig. 2 is a plan view thereof; and

Fig. 3 is a detail sectional view on the line 3—3 of Fig. 2.

Figure 1:
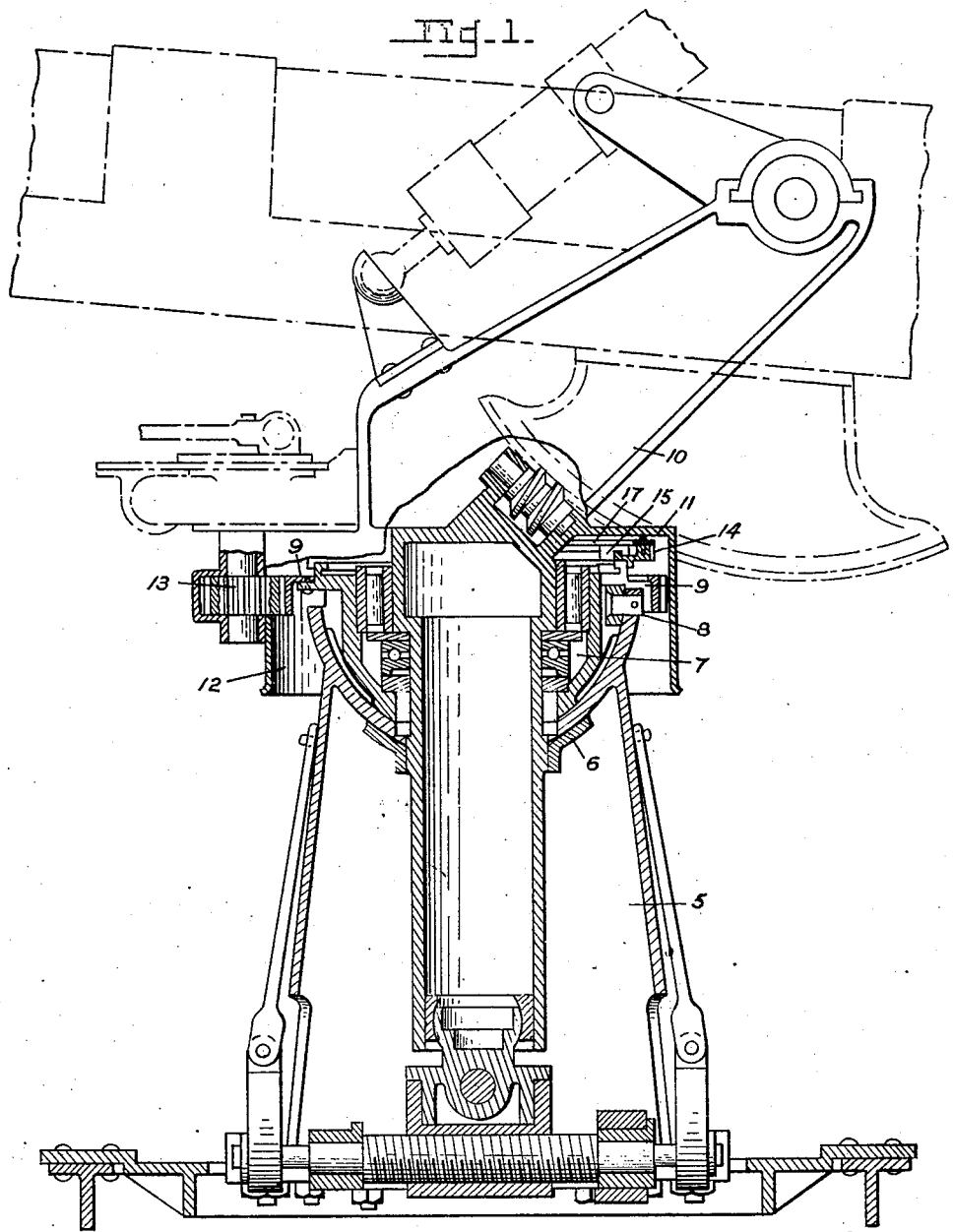
Fig. 1 is a longitudinal sectional view of a gun mount equipped with my improved mechanism.

Referring to the drawings by numerals of reference:

I have shown a pedestal 5 having at its upper end a socket 6 adapted to receive a hemispherical housing 7 held against rotation by studs 8 and equipped with a traversing ring gear 9. The housing through suitable bearings revolubly supports a top carriage 10 having a deck 11 and an apron 12. The top carriage is traversed by means of a pinion 13 mounted from said carriage and meshing with the stationary ring gear 9.

Encircling the housing 7 under the deck of the top carriage is a gear 14 clamped by means of two short plates 15—15 (Fig. 3) and screws 16 so as to normally remain stationary and being capable of rotation during adjustment by merely loosening the plates. Secured to this gear is a ring 17 bearing the azimuth scale and graduated from 0 to 64,000 in increments of 100 mils. A portion of the scale is visible through a window 18 located in the deck of the carriage.

Bolted to the deck is a case 19 having a removable cover 20 and enclosing the elements of the micrometer mechanism. Within the case is a bearing 21 between which and the bottom of the case are journaled the elements of a multiplying gear train consisting of a gear 22 and a pinion 23 which meshes with the gear 14 on which the azimuth scale 17 is mounted. The spindle 22' of the gear 22 threadedly carries a dial 24, having planetary movement with respect to the scale 17, and graduated from 0 to 100 in single mils, the portion of the dial adjacent the azimuth scale being visible through the window 18 on which is engraved a reference or zero line 25. Obviously, the azimuth scale could be mounted on a carriage so as to have planetary movement with respect to the dial and such an arrangement could be used with mounts having limited traverse where the traversing operator, who in such event would be stationary, would take up a position beyond the limits of traverse.

In order to provide for adjustment of the azimuth scale 17 to suit the circumstances of the mount or aiming point, the deck of the carriage is formed with a curved slot 26 with which the screws 16—16 may be brought into register and unthreaded sufficiently to release the clamping action of the plates 15—15. The plates are provided with holes 27 in which a pin not shown may be inserted to lock the plates to the top carriage. When the dial case 19 is removed, the ring 17 bearing the azimuth scale may be turned until the zero of the scale is directly under the reference line 25 on the window. The dial 24 may then be assembled so that its zero also coincides with the reference line.

If it is desired to reset the azimuth scale with the dial case 19 in place, the plates 15—15 are adjusted as above to be rotated with the top carriage, the ring gear 14 being unclamped. A small socket wrench 28 is then applied through an aperture in the dial case cover 20 to the spindle 22' and the dial turned until the required scale division coincides with the reference line 25 after which the screws 16—16 are again tightened.

Since the dial and the scale are geared together they will be rotated in unison when the ring 14 is unclamped. The spring covers 29 and 30 are provided to respectively close the slot 26 in the deck of the carriage and the aperture in the cover 20.

While in the foregoing there has been illustrated and described such combination and arrangement of elements as constitute the preferred embodiment of the invention, it is nevertheless desired to emphasize the fact that interpretation of the invention should only be conclusive when made in the light of the subjoined claims.

I claim:

1. The combination with a gun mount, of a top carriage rotatably supported thereby, a pair of clamping plates on the mount, a gear retained by said plates, an azimuth scale ring attached to said gear and graduated in increments of 100 mils, a window including a reference line in the carriage through which a portion of said scale is visible, a case secured to the carriage adjacent the window, a dial in said case graduated from 0 to 100 in units of a single mil, a portion of the dial scale being visible through the window, a multiplying gear train carrying the dial and geared to the gear on the mount, and means whereby the clamping plates may be rotated with the carriage to provide for adjustment of the azimuth scale with the dial case either removed or in place.

2. The combination with a gun mount, of a top carriage rotatably supported thereby, a pair of clamping plates on the mount, a gear retained by said plates, an azimuth scale ring attached to said gear and graduated in increments of 100 mils, a window including a reference line in the carriage through which a portion of said scale is visible, a case secured to the carriage adjacent the window, a dial in said case graduated from 0 to 100 in units of a single mil, a portion of the dial scale being visible through the window, a multiplying gear train carrying the dial and geared to the gear on the mount, and means whereby the azimuth scale may be adjusted with respect to the reference line.

3. The combination with a gun mount, of a top carriage rotatably supported thereby, a pair of clamping plates on the mount, a gear retained by said plates, an azimuth scale ring attached to said gear and graduated in increments of 100 mils, a window including a reference line in the carriage through which a portion of said scale is visible, a case secured to the carriage adjacent the window, a dial in said case graduated from 0 to 100 in units of a single mil, a portion of the dial scale being visible through the window, and a multiplying gear train carrying the dial and geared to the gear on the mount.

4. The combination with a gun mount, of a top carriage rotatably supported thereby, a gear normally fast on the mount but capable of independent rotation without detachment, said gear including a graduated azimuth scale at least a portion of which is visible, a reference on the carriage against which the scale may be read, a case secured to the carriage, a dial mounted in said case to be adjacent the azimuth scale and graduated in divisions of the unit of said scale, and a multiplying gear train carrying the dial and geared to the azimuth scale gear, and means whereby the azimuth scale gear may be adjusted with respect to the reference.

5. The combination with a gun mount, of a top carriage rotatably supported thereby, a gear carried by the mount, said gear including a graduated azimuth scale at least a portion of which is visible, a reference on the carriage against which the scale may be read, a case secured to the carriage, a dial mounted in said case to be adjacent the azimuth scale and graduated in divisions of the unit of said scale, and a multiplying gear train carrying the dial and geared to the azimuth scale gear.

6. The combination with a gun mount, of a top carriage rotatably supported thereby, a graduated azimuth scale carried by the mount, a dial carried by the top carriage and graduated in divisions of unit of the scale, a multiplying gear train connecting the dial and the scale, and a reference against which scale and dial map be read.

THOS. A. CONLON.